(12) United States Patent
Nurmia

(10) Patent No.: US 8,795,413 B2
(45) Date of Patent: Aug. 5, 2014

(54) METHOD FOR DISSOLVING CARBON DIOXIDE FROM FLUE OR OTHER GAS AND FOR NEUTRALIZING THE SOLUTION OBTAINED

(75) Inventor: Matti Nurmia, Jyvaskyla (FI)

(73) Assignee: Cuycha Innovation Oy, Rajamaki (FI)

( * ) Notice: Subject to any disclaimer, the term of this patent is extended or adjusted under 35 U.S.C. 154(b) by 396 days.

(21) Appl. No.: 12/996,081

(22) PCT Filed: Jun. 30, 2009

(86) PCT No.: PCT/FI2009/050588
§ 371 (c)(1),
(2), (4) Date: Dec. 3, 2010

(87) PCT Pub. No.: WO2010/000937
PCT Pub. Date: Jan. 7, 2010

(65) Prior Publication Data
US 2011/0083555 A1    Apr. 14, 2011

(30) Foreign Application Priority Data
Jun. 30, 2008 (FI) .................................. 20080422

(51) Int. Cl.
*B01D 47/00* (2006.01)
*B01D 53/14* (2006.01)

(52) U.S. Cl.
USPC ........ 95/94; 95/195; 95/205; 95/227; 95/236; 423/437.1

(58) Field of Classification Search
USPC ........ 95/94, 149, 196, 234, 236; 423/11, 112, 423/437.1
See application file for complete search history.

(56) References Cited

U.S. PATENT DOCUMENTS

| 6,890,497 B2 * | 5/2005 | Rau et al. ....................... 423/220 |
| 7,132,090 B2 * | 11/2006 | Dziedzic et al. .............. 423/230 |
| 7,282,189 B2 | 10/2007 | Zauderer |
| 2004/0126293 A1 | 7/2004 | Geerlings et al. |
| 2008/0138265 A1 * | 6/2008 | Lackner et al. ............... 423/224 |

* cited by examiner

*Primary Examiner* — Duane Smith
*Assistant Examiner* — Joubert X Glover
(74) *Attorney, Agent, or Firm* — Fildes & Outland, P.C.

(57) ABSTRACT

The object of the invention is a method for dissolving carbon dioxide from flue or other gas and for the neutralization of the solution obtained. The gas, in which the partial pressure of carbon dioxide is at least 0.4 bar, is led to a dissolution process, where the major part of the carbon dioxide is dissolved into a flow of water. The aqueous solution of carbon dioxide thus obtained is neutralized by passing it through a material containing feldspar minerals, at which time the hydrogen ions of said solution are replaced by ions of alkali or alkaline earth metals, and the aluminum in said material is converted into aluminum compounds that can be separated and utilized.

13 Claims, 3 Drawing Sheets

METHOD FOR DISSOLVING CARBON DIOXIDE FROM FLUE OR OTHER GAS AND FOR NEUTRALIZING THE SOLUTION OBTAINED

The object of the invention is a method for dissolving carbon dioxide from flue or other gas and for neutralizing the solution obtained.

For a long time still we are forced to produce most of the energy we consume from carbonaceous fuels. As, on the other hand, the pressures for reducing carbon dioxide emissions increase, attention has focused on methods for capturing $CO_2$ from flue gases and its sequestration [1]. In the known technology $CO_2$ is separated from flue gases usually into MEA- or other basic solutions and removed from these solutions by heating. These processes demand so much energy that the energy efficiency of the power plants is substantially reduced. Both the studies performed at Tampere Technical University [3] and elsewhere [4] have revealed that it is more advantageous to shift to oxygen combustion, where the flue gas produced is nearly entirely $CO_2$, than to separate and pressurize the $CO_2$ from the flue gas of air combustion.

The methods for sequestrating $CO_2$ presented in the literature evoke questions about their reliability over long periods of time. An example of these processes is U.S. Pat. No. 5,304,356, where liquefied $CO_2$ is led to the bottom of the deep ocean, where the water is cold and $CO_2$ forms clathrates and hydrates that are stable at low temperature under a high pressure. Such structures do exist in nature in deep oceans, but there are no guarantees about their stability as the oceans become warmer under climate change.

Even when using oxygen combustion, the pressurizing of the separated $CO_2$ and its transportation to the proposed storage sites require extensive arrangements and uses large amounts of energy, the production of which increases the amount of $CO_2$ to be stored and impairs the economy of the process.

Because of these drawbacks it has been proposed in the literature that the $CO_2$ be converted into carbonates, the storage of which is not beset with appreciable risks. This would happen, e.g., in the serpentine reaction, where the magnesium silicate of olivine is converted under the influence of water and $CO_2$ into Mg carbonate and serpentine, $Mg_3[Si_2O_5](OH)_4$ [5]. This process requires heating of the constituents and Fe-poor olivine, which is found in large quantities in only a few locations.

Among others, in U.S. Pat. No. 7,282,189 is discussed the leading of the separated and pressurized $CO_2$, often in a liquefied state, into natural deposits of limestone or dolomite, where in a reaction of water, $CO_2$, and limestone or resp. dolomite, soluble calcium or magnesium bicarbonate is formed. Suitable limestone or dolomite deposits exist only to a limited extent and the leading of flows of millions of tons of $CO_2$ into them cannot be considered a reliable solution.

In Publication WO200818928 is mentioned "the possibility that $CO_2$ reacts with a basic solution forming a product such as $NaHCO_3$". In the process water is treated forming an acid solution and a basic solution. The acid solution is then neutralized and the basic one is used to capture $CO_2$. As in the known art in general, in this process, too, one is forced to use chemical compounds on the same scale as the $CO_2$ flow to be treated.

In Publication CN1473762(A) is presented a process for the production of aluminum hydroxide from, among others, aluminum containing minerals with the help of $CO_2$ of the waste gas of a fermentation process.

In Publication JP2002035549(A) is presented a process in which $CO_2$ is dissolved from the flue gas of a combustion process into water and the obtained solution is neutralized with the help of a "neutralizing compound".

The object of this application is an invention where $CO_2$ is captured from a gas stream in a physical process of dissolution in which the solvent is a flow of water obtained from nature. The characteristic features of the method according to the invention are presented in Claim 1. The acidity of the $CO_2$ solution obtained is neutralized with the help of feldspar minerals of gravel, sand, or crushed rock material obtained from nature. This process is the same as the weathering of feldspar minerals caused by $CO_2$ of rainwater, e.g.:

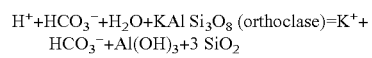
$$H^+ + HCO_3^- + H_2O + KAl\,Si_3O_8 \text{ (orthoclase)} = K^+ + HCO_3^- + Al(OH)_3 + 3\,SiO_2$$

The natural weathering process requires years, for the $CO_2$ content of rainwater corresponds to the partial pressure of $CO_2$ in the atmosphere, about 0.0004 bar. In the process of this invention the $CO_2$ content of the solution is at least 1000-fold and the process is correspondingly faster.

The feldspar minerals orthoclase and albite, in which there is sodium in place of potassium, are the principal minerals of, among others, the granulites of Lapland. The rapakivi rocks of southern Finland on the other hand consist principally of potassium feldspar and plagioclase. Sand or crushed rock composed of these minerals is capable of neutralizing ca. 150 kg of $CO_2$ per ton. The neutralized solution, in which the hydrogen ions are replaced with ions of alkali or alkaline earth metals, can be passed to the sea or rivers without increasing the acidity of the waters.

In the neutralization the aluminum of the feldspar minerals is converted into bauxite, which is a mixture of gibbsite, $Al(OH)_3$, and kaolinite, $Al_2Si_2O_5(OH)_4$, and which can be utilized as explained later.

In order to keep the amount of water required by the dissolution process reasonable it is necessary to keep the partial pressure of $CO_2$ in the flue or other gas treated sufficiently high, in practice at least at 0.4 bar. Flue gas at normal pressure can be pressurized with a compressor, advantageously equipped with water injection, to, say, 5 bar. If a coal-burning power plant uses instead of air an oxygen enrichment of 40%, there will be in its flue gas ca. 30% $CO_2$ and the partial pressure of $CO_2$ in the pressurized gas will be 1.5 bar. When washing such gas with water at +5°, the solubility of $CO_2$ in it is 4.5 kg per ton of water.

The power required by the compressor can be produced by transferring heat from the gas coming to the washing process into the gas exiting from the process and by expanding the latter to normal pressure in a turbine coupled to the compressor, as explained in Embodiment 1. Such combinations of compressor and turbine attain a total efficiency of about 70% [7].

The water consumption of the process can be reduced by recycling a part of the bicarbonate solution formed in the neutralization back to the washing process as explained in Embodiment 1. The washing and neutralization processes can also be combined to take place in one vessel that contains crushed rock, as explained in Embodiment 2.

The water consumption of the process is smaller, and the neutralization process correspondingly faster, the higher is the partial pressure of $CO_2$ that corresponds to the $CO_2$ content of the solution employed. If the gas to be processed is nearly pure $CO_2$, it can be dissolved in water either as gas or as liquid under a considerably high pressure, as explained in Embodiment 3.

As a consequence of the weathering taking place in nature the waters of the rivers of Europe contain on the average 0.95 mmol of bicarbonate ions per kilogram of water. The corresponding concentration in water of oceans is still higher, 2.39 mmol per kg [6]. Even this value is low compared to the concentration of $CO_2$ in the atmosphere, which increases continuously and is now ca. 385 ppm or 13 mmol per kg of air. The $CO_2$ of the atmosphere dissolves into rainwater and is converted in the weathering into bicarbonates, which flow into the seas in river waters and are incorporated from the sea water into, among others, corals. This process functions as an efficient sink of carbon [8]. This invention offers a natural and safe method for transferring our climate-changing carbon dioxide emissions into this sink.

A 1000 MW steam power plant that operates 50% of the time will produce about 4 million tons of $CO_2$ annually. For the neutralization of this amount about 10 million $m^3$ of silicate rock material is required annually. The Siilinjärvi phosphate deposit, of which about 5 million $m^3$ is quarried annually, is suitable for comparison [2].

In the neutralization process of one ton of $CO_2$ is formed about 2 tons of bauxite, which can be separated from the rock material by washing. It can be advantageously processed into aluminum oxide, the world market price of which is ca. 400 USD per ton [9].

The neutralization can be performed in an open pit in which the crushed rock material is covered with a layer of water that maintains the pressure required in the neutralization and prevents the evaporation of the $CO_2$ into the atmosphere. The bauxite formed can be washed away from the neutralization process and recovered, e.g., in settling pools.

The environmental drawbacks of an open pit can be avoided by performing the dissolution, neutralization, and bauxite recovery in subterranean spaces as explained in Embodiment 2.

The method will be described in the following Embodiments with reference to the Figures appended.

EMBODIMENT 1

Figure 1:
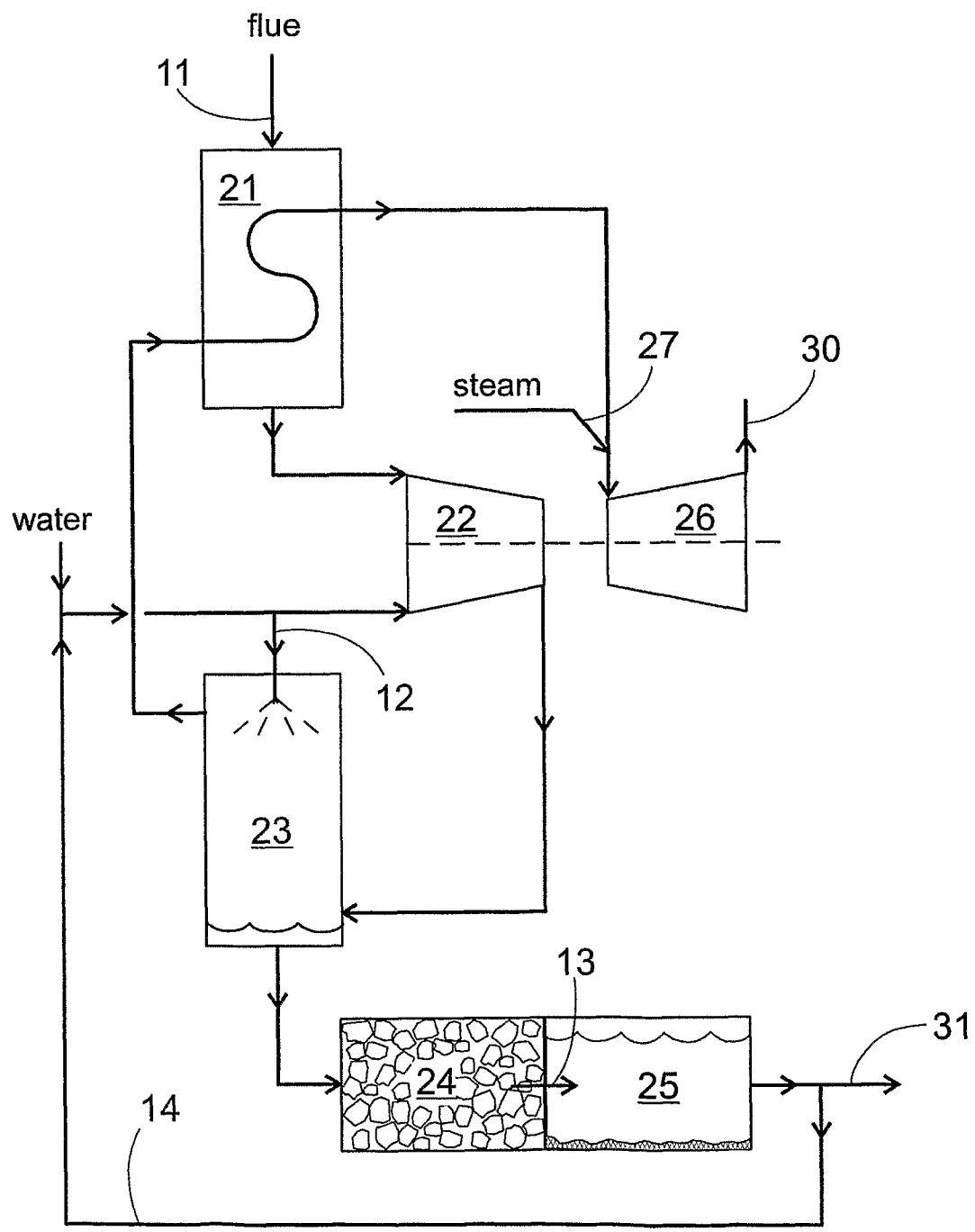
FIG. 1 shows an Embodiment of the method where a part of the water flow exiting from the process is circulated back into the process.

The method is shown schematically in FIG. 1. The flue or other gas at normal pressure is passed via connection 11 to heat exchanger 21, from which it exits into compressor 22 equipped with water injection. From it the flow proceeds at a pressure of, say, 5 bar into washing column 23, into which cold water is sprayed via connection 12. The majority of the $CO_2$ dissolves into the water flow and the $CO_2$ solution formed is passed into neutralization space 24 containing gravel, sand, or crushed rock, from which the neutralized solution exits via connection 13 into bauxite settling pool 25. The bauxite precipitate is collected from this pool at regular intervals. A part of the solution is recycled back into the washing process via connection 14 to reduce the consumption of water and the remainder is removed via connection 31. The crushed rock or other such material of the neutralization space is exchanged at regular intervals.

The flue gas exiting from the top of column 23 is warmed in heat exchanger 21 and passed into exhaust gas turbine 26 that is coupled to compressor 22. The flue gas exits the process from turbine 26 via connection 30. In the input flow of the turbine is placed a steam injector 27, with which the unit is started and which can be used to elevate the pressure level of the dissolution if required. Depending on the $CO_2$ content of the flue gas and the temperature and pressure conditions of the process, the combination of turbine and compressor may produce surplus mechanical energy, which can be utilized with a generator coupled to it (not shown).

EMBODIMENT 2

Figure 2:
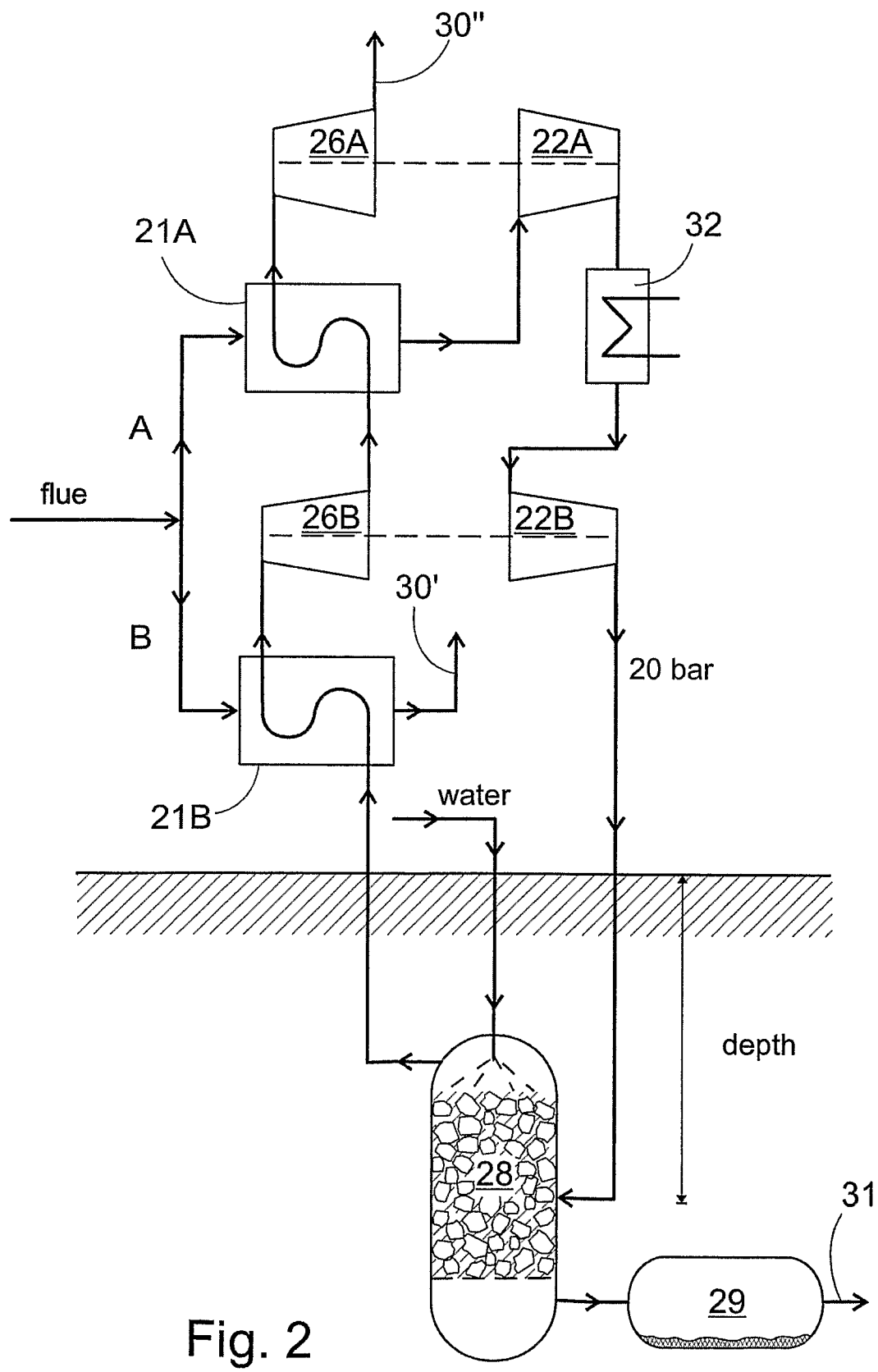
FIG. 2 shows a second Embodiment of the method where only a part of the flue gas flow is processed and where the washing and neutralization processes are combined.

The process is shown schematically in FIG. 2. The flue gas at normal pressure is divided into two streams A and B, of which A is pressurized to, say, 20 bar. The $CO_2$ of stream B is not processed, but the energy requirement of the process is covered with the surplus heat of this stream.

Stream A is passed to heat exchanger 21A, from which it exits to compressor 22A. From it the stream passes at, say, the pressure of 5 bar through intercooler 32 into compressor 22B and from it at a pressure of 20 bar into the washing and neutralization process. Stream B delivers heat into the processed A stream in heat exchanger 21B and then exits the process via connection 30'.

The washing of the flue gas and the neutralization of the solution obtained is performed so deep underground that the water arriving in the process is pressurized to the required pressure. The washing and neutralizing spaces are combined into chamber 28, in the top part of which the flue gas streams upwards while the dissolving water flows against it through the crushed rock. The $CO_2$ solution formed is partially neutralized in this section and it then flows into the lower part of the chamber, where the neutralization continues and from where the solution passes into bauxite settling pool 29, after which it leaves the process via connection 31. The flue gas stream exiting from chamber 28 is warmed in heat exchanger 21B, expanded in turbine 26B, reheated in heat exchanger 21A and expanded to normal pressure in turbine 26A, after which the stream exits from the process via connection 30".

EMBODIMENT 3

Figure 3:
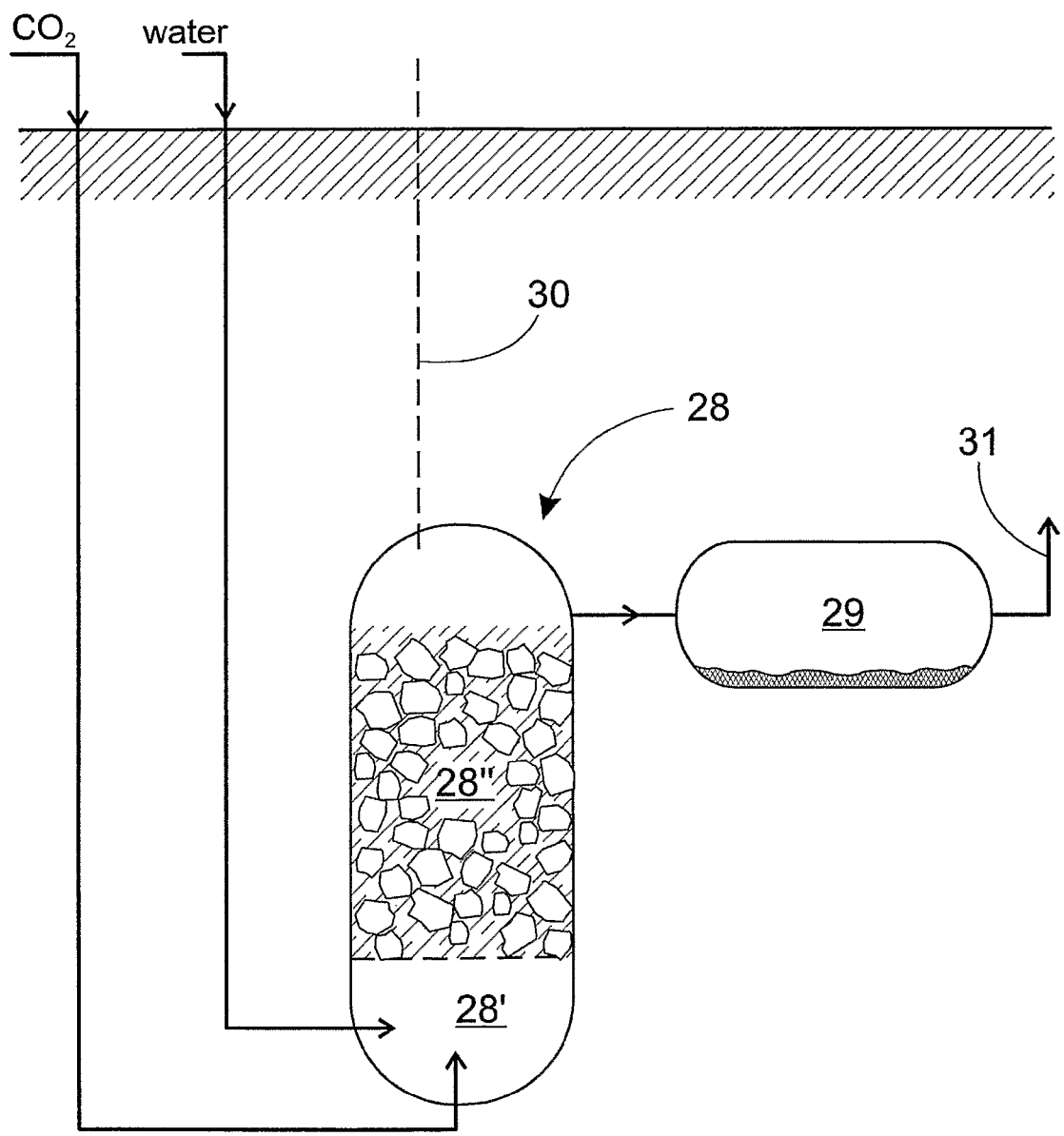
FIG. 3 shows a third Embodiment of the method where the process gas is nearly pure, gaseous or liquefied carbon dioxide.

In this Embodiment gaseous or liquefied carbon dioxide which is under substantial pressure, say, 20-40 bar, is processed. The $CO_2$ solution formed in the process contains a large amount of $CO_2$ and its neutralization process is correspondingly accelerated. The process is presented schematically in FIG. 3. The dissolution and neutralization take place in subterranean chamber 28. In its lower part 28' carbon dioxide is dissolved into water, which then flows upwards through a fluidized bed 28" filled with crushed rock and from there to settling pool 29, where the bauxite separates. The water flow exits via connection 31. When needed, a small amount of gas is vented from chamber 28 via connection 30, because all the carbon dioxide cannot be dissolved into the water flow, from which other gases may also separate into the top part of the chamber.

The embodiments of this invention are extremely varied and they are not limited to the examples described here.

This method offers the following advantages compared to the known art:
  the $CO_2$ is dissolved from the process gas into water without the use of chemicals,
  the $CO_2$ solution is neutralized with natural silicate minerals without the use of chemicals or heating,
  in the neutralization no carbonates are used so that the carbon permanently combined in them is not mobilized, in the neutralization process are formed aluminum compounds that provide a valuable byproduct [9].

REFERENCES

1. Wikipedia: *Carbon Capture and Storage* and references therein.
2. Tilastotietoja vuoriteollisuudesta 2003. Ministry of Commerce and Industry, Finland
3. Aarikka, *Capture of Carbon Dioxide from Power Plants*, Tampere U. of Tech. 2001.
4. Singh et al., *Energy Conv. and Management* 44, 3073-91 (2003).
5. Wikipedia: *Carbon dioxide sink* and O'Connor et al, Carbon Dioxide Sequestration, Albany Research Center, U.S. DOE, 1450 Queen Ave. SW, Albany, Oreg. 97321.
6. A. Lerman, L. Wu, *J. Geochem. Explor.* 88, 427-430 (2006).
7. ABB Turbo Systems Ltd., Bruggerstrasse 71 a, CH-5401 Baden/Switzerland.
8. What Controls the Composition of River Water (Chapter 7, Univ. of Washington) www.ocean.washington.edu/courses/oc400/Lecture_Notes/CHPT7.pdf
9. www.crugroup.com

The invention claimed is:

1. A method for dissolving carbon dioxide from flue or other gas and for neutralizing the solution obtained by means of feldspar minerals and for obtaining an aluminum compound, such as bauxite, wherein said gas, in which the partial pressure of carbon dioxide is at least 40 kPa (0.4 bar), is led into a dissolving process, wherein the most part of the carbon dioxide is dissolved into a flow of water, and the aqueous solution of carbon dioxide thus obtained is neutralized by passing it through a material containing feldspar minerals, at which time the hydrogen ions of said solution are replaced by ions of alkali or alkaline earth metals, and the aluminum of said material is converted into aluminum compounds, such as bauxite, that can be separated and utilized.

2. A method according to claim 1, characterized in that the partial pressure of carbon dioxide in said gas is maintained at least at 0.4 bar by using oxygen or air enriched in oxygen in the process in which the carbon dioxide is produced.

3. A method according to claim 1, characterized in that the partial pressure of carbon dioxide in said gas is maintained at least at 0.4 bar by pressurizing air, or an oxygen-containing gas that is brought into the process in which the carbon dioxide is produced, with a compressor.

4. A method according to claim 1, characterized in that the partial pressure of carbon dioxide in said gas is maintained at least at 0.4 bar by pressurizing said gas to a pressure higher than normal pressure with a compressor.

5. A method according to claim 4, characterized in that at least a part of the energy required by said compressor is produced with a turbine, the motive power of which is the heated gas flow that exits from the said washing process and is at a pressure higher than normal pressure.

6. A method according to claim 5, characterized in that at least a part of the heating mentioned in claim 5 is performed by transferring heat in a heat exchanger into said flow from the gas flow entering the said washing process.

7. A method according to claim 1, characterized in that said washing column and neutralization space are placed underground to such a depth that the water brought into the washing process is pressurized to the pressure required by the process.

8. A method according to claim 1, characterized in that a part of the water flow that exits from said neutralization process is returned to said washing process, while the remainder of said flow exits from the process.

9. A method according to claim 1, characterized in that said neutralization process takes place in a fluidized bed containing crushed rock material, in which an aqueous solution of carbon dioxide flows upwards.

10. A method according to claim 1, characterized in that the water flow used in the dissolution consists of partial flows obtained from nature and said neutralization.

11. A method according to claim 1, characterized in that the material containing feldspar minerals is at least in part sand, gravel, or crushed rock.

12. A method according to claim 3, characterized in that at least a part of the energy required by said compressor is produced with a turbine, the motive power of which is the heated gas flow that exits from the said washing process and is at a pressure higher than normal pressure.

13. A method according to claim 12, characterized in that at least a part of the heating mentioned in claim 12 is performed by transferring heat in a heat exchanger into said flow from the gas flow entering the said washing process.

* * * * *